(12) United States Patent
Dunavan

(10) Patent No.: US 8,740,139 B1
(45) Date of Patent: Jun. 3, 2014

(54) LEADING EDGE SNAG FOR EXPOSED PROPELLER ENGINE INSTALLATION

(75) Inventor: Marcus A. Dunavan, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/453,218

(22) Filed: Apr. 23, 2012

(51) Int. Cl.
*B64D 27/00* (2006.01)

(52) U.S. Cl.
USPC ........................................................... 244/54

(58) Field of Classification Search
USPC ............. 244/54, 55, 35 R, 123.1, 200, 200.1, 244/45 R
See application file for complete search history.

(56) References Cited

U.S. PATENT DOCUMENTS

| | | | |
|---|---|---|---|
| 2,769,602 A | | 11/1956 | Furlong |
| 3,053,484 A | * | 9/1962 | Alford, Jr. et al. ............ 244/218 |
| 3,229,933 A | * | 1/1966 | Kutney John T ................ 244/55 |
| 3,807,665 A | * | 4/1974 | Coombe .......................... 244/55 |
| 4,637,573 A | * | 1/1987 | Perin et al. ....................... 244/54 |
| 4,717,094 A | | 1/1988 | Chee |
| 4,801,058 A | | 1/1989 | Mullins |
| 5,056,741 A | | 10/1991 | Bliesner et al. |
| 5,842,666 A | | 12/1998 | Gerhardt et al. |
| 6,152,404 A | | 11/2000 | Flaig et al. |
| 6,364,254 B1 | | 4/2002 | May |
| 6,513,754 B1 | * | 2/2003 | Grove .......................... 244/35 A |
| 6,978,971 B1 | | 12/2005 | Dun |
| 7,850,116 B2 | | 12/2010 | Stuhr |
| 7,883,052 B2 | | 2/2011 | Hahn et al. |
| 8,118,265 B2 | * | 2/2012 | Ferrari ............................ 244/214 |
| 8,186,619 B2 | * | 5/2012 | Bonnaud et al. ................. 244/54 |
| 2007/0262207 A1 | | 11/2007 | Morgenstern et al. |
| 2007/0284477 A1 | * | 12/2007 | Guering ........................... 244/54 |
| 2009/0020643 A1 | * | 1/2009 | Gall et al. ......................... 244/54 |
| 2010/0286849 A1 | | 11/2010 | Huynh et al. |

OTHER PUBLICATIONS

Green et al., "F/A-18C to E Wing Morphing Study for the Abrupt Wing Stall Program," AIAA 2003-0925, 41st AIAA Aerospace Sciences Meeting & Exhibit, Jan. 6-9, 2003, Reno, Nevada.
Quest for Performance: The Evolution of Modern Aircraft, Chapter 4: "Early Jet Fighters," (see Figure 11.10), http://history.nasa.gov/SP-468/ch11-3.htm.
Kundu, "Aircraft Design," Cambridge University Press, Cambridge, U.K. (2010), p. 77 (see Figure 3.31).

* cited by examiner

*Primary Examiner* — Timothy D Collins
*Assistant Examiner* — Jessica Wong
(74) *Attorney, Agent, or Firm* — Ostrager Chong Flaherty & Broitman P.C.

(57) ABSTRACT

An airplane powered by exposed propeller engines has a swept wing configuration comprising a leading edge snag coincident with the exposed propeller engine mount. The portion of the leading edge disposed inboard of the exposed propeller engine is offset in an aftwise direction relative to the outboard portion of the leading edge. As a result of this construction, the point of closest approach of the blades of the exposed propeller engines is moved aft, allowing for a more compact engine installation.

10 Claims, 6 Drawing Sheets

LEADING EDGE SNAG FOR EXPOSED PROPELLER ENGINE INSTALLATION

BACKGROUND

This disclosure generally relates to wing and tail configurations for aircraft. More specifically, this disclosure relates to swept wings and tails having an engine with an exposed propeller mounted thereon.

When installing an engine with an exposed propeller in front of a wing, the closest approach of the blades to the leading edge of the wing controls how close the engine can be installed to the wing. This distance strongly affects structural fatigue, noise, and interference drag. A rough rule of thumb is that the closest approach should be no closer than 0.35 propeller diameters from the leading edge. For slower sub-sonic aircraft, or engines with only one row of propeller blades, this constraint is less problematic, but for aircraft traveling at high speeds, this causes the engine to be slung further forward on the aircraft, which increases the weight of the engine support structure due to higher static and dynamic loads. Higher local sweep angles in the wake of an exposed propeller engine make the problem worse because, as sweep angle increases, the engine must move further forward to maintain the required clearance. Multiple rows of propeller blades make the problem worse because the engine is longer and the aft-most blades are further aft as a percentage of engine length.

Although the engine can be moved forward to accommodate the required clearance, this would result in longer, heavier, and higher aerodynamic drag engine installations. Alternatively, local wing sweep could be decreased to a less-than-desired amount, which would have the effect of increasing aerodynamic drag.

Accordingly, there is a need for a wing or tail configuration that reduces weight and drag of exposed propeller engine installations and can enable the viable integration of open rotor technology on the wings or tail of commercial aircraft.

SUMMARY

The wing and tail configurations disclosed hereinafter address some or all of the above-discussed problems and needs. For a wing-mounted or tail-mounted engine on a swept planform with one or more rows of propeller blades, a longer outboard chord is combined with a leading edge snag buried in the engine mount to create an offset leading edge, while providing an equivalent planform area.

In accordance with one embodiment, a swept wing configuration comprises a leading edge snag coincident with the engine mount, with the portion of the leading edge disposed inboard of the exposed propeller engine being offset in an aftwise direction relative to the outboard portion of the leading edge. As a result of this construction, the point of closest approach of the propeller blades is moved aft, allowing for a more compact engine installation. This may result in weight and parasitic drag savings. This solution allows leading edge gloves to be preserved, maintaining higher sweep in the wake of the exposed propeller engine. The solution can potentially be utilized without planform changes aft of the front spar. For aft-swept wings, the change in chord distribution (more outboard chord) may result in a more desirable wing loading from an aerodynamic point of view. Because the snag is buried in the engine mount, it creates no aerodynamic drag and typical control surface layouts and structural arrangements can be used. The wing loft impacts of the change in chord can be spread out across the width of the engine mount.

One aspect of the disclosed subject matter is a wing for an aircraft powered by exposed propeller engines, comprising swept leading and trailing edges and a leading edge snag coincident with a mounting location for an engine.

Another aspect is an aircraft comprising a fuselage, a swept airfoil-shaped body projecting from to the fuselage, and an exposed propeller engine mounted to the airfoil-shaped body. The airfoil-shaped body comprises a leading edge snag coincident with a mounting location of the exposed propeller engine.

A further aspect of the disclosed subject matter is an aircraft comprising a fuselage, a wingbox that is attached to the fuselage, left and right wing panels supported by the wingbox, and first and second exposed propeller engines respectively mounted to the left and right wing panels. Each of the left and right wing panels comprises upper and lower surfaces and swept leading and trailing edges. Each leading edge comprises an inboard spanwise portion disposed between the fuselage and the exposed propeller engine mounted thereto, an outboard spanwise portion disposed between the exposed propeller engine mounted thereto and a tip of the wing panel, and a snag that connects the inboard and outboard spanwise portions. The inboard spanwise portion is offset in an aftwise direction relative to the outboard spanwise portion.

Other aspects of the invention are disclosed and claimed below.

BRIEF DESCRIPTION OF THE DRAWINGS

Various embodiments will be hereinafter described with reference to drawings for the purpose of illustrating the foregoing and other aspects of the invention.

Reference will hereinafter be made to the drawings in which similar elements in different drawings bear the same reference numerals.

DETAILED DESCRIPTION

Figure 1:
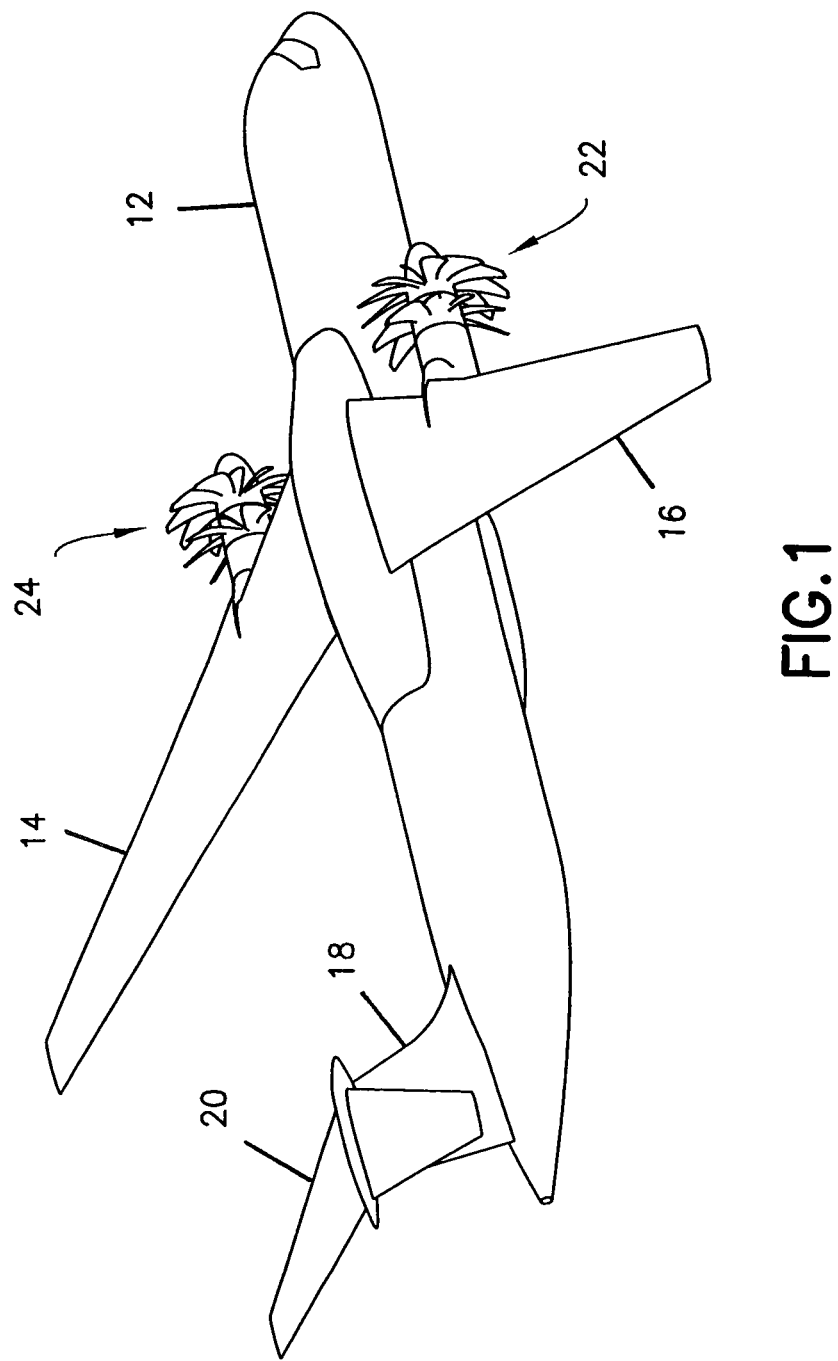
FIG. 1 is a diagram showing an isometric view of an aircraft having wing-mounted exposed propeller engines, each wing having an inboard leading edge that is offset in the aftwise direction relative to the outboard leading edge.

FIG. 1 shows an aircraft that is powered by a pair of exposed propeller engines 22 and 24. The aircraft comprises a fuselage 12, a left wing panel 14, a right wing panel 16, a fin or vertical stabilizer 18 attached to the fuselage 12, and a horizontal stabilizer 20 mounted on top of the fin 18 to form a T-tail. One exposed propeller engine 22 is mounted to the right wing panel 16, while the other exposed propeller engine 24 is mounted to the left wing panel 14. The exposed propeller engines may be mounted to the wing panels by any known method. For example, the wing may support an over-the-wing mounting of an exposed propeller engine nacelle in a "slipper" (i.e., no pylon or strut) fashion. The particular methods of attaching and/or integrating the engine nacelles with the wing via a "slipper" attachment are known to persons skilled in the art. Alternatively, the aft section of each engine could be mounted to a respective wing panel by means of a pylon or strut. A strut fairing may be provided in a known manner.

Figure 2:
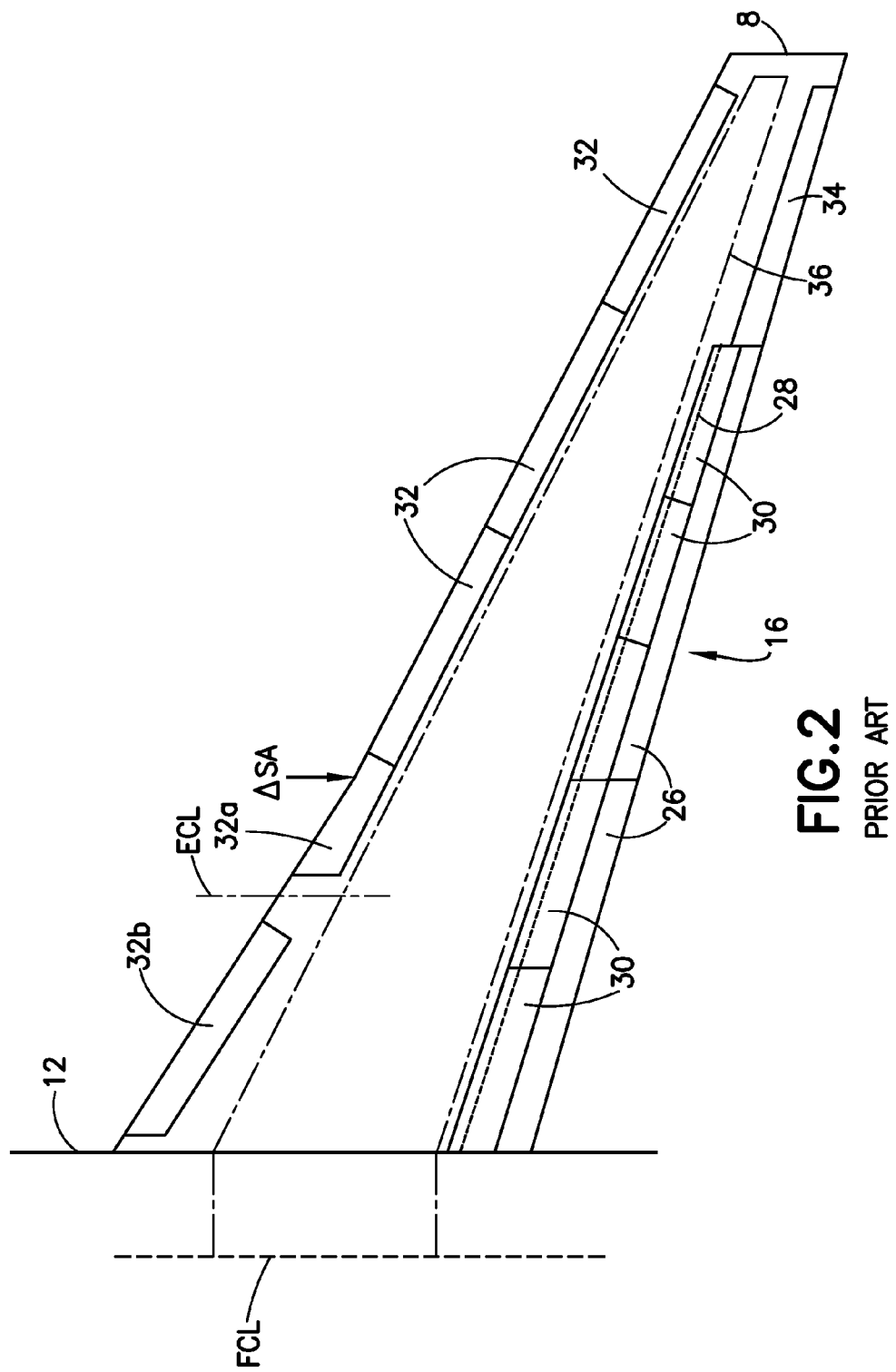
FIG. 2 is a diagram showing a plan view of a portion of a wing planform suitable for mounting an exposed propeller engine (not shown) thereto.
Figure 3:
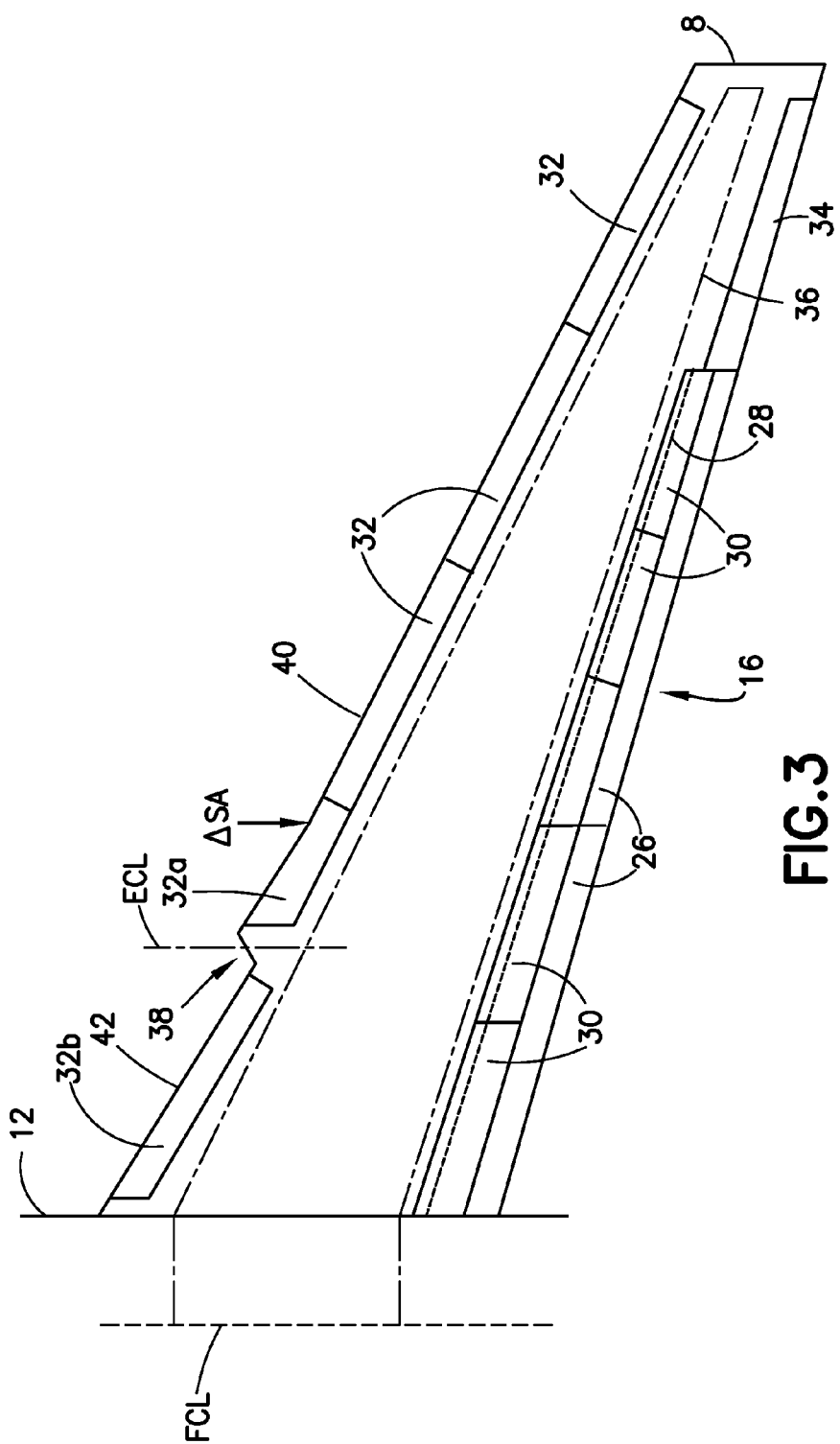
FIG. 3 is a diagram showing a plan view of a portion of a wing planform in accordance with one embodiment (the wing-mounted exposed propeller engine is not shown).

FIGS. 2 and 3 show a right wing panel 16 attached to a fuselage 12. FIG. 2 shows a known swept wing configuration; FIG. 3 shows a swept wing configuration in accordance with one embodiment of the invention. Both wing panels have swept leading and trailing edges, with the sweep angle of the latter being less than the sweep angle(s) of the former. The dashed line FCL in each drawing indicates a centerline of the fuselage 12. The parallel line ECL indicates a centerline of an engine (not shown) that will be mounted to the wing panel 16.

The wing panels shown in FIGS. 2 and 3 comprise conventional control surfaces. An aileron 34 is positioned proximate to the swept trailing edge and the wing tip 8. Flaps 26 are positioned proximate to the section of the swept trailing edge. Spoilers 30 are positioned proximate to the flaps 26. The dashed line 28 indicates the location of the fixed leading edges of the flaps 26. In addition, a plurality of slats are positioned proximate to the swept leading edge, including outboard slats 32 and 32a and an inboard slat 32b.

As seen in FIG. 2, the leading edge undergoes a change in sweep angle at the location indicated by arrow ΔSA. (The sweep angle is measured relative to a line perpendicular to the longitudinal axis FCL of the fuselage as is known in the art.) The sweep angle of the section of the leading edge extending from the fuselage to location ΔSA is greater than the sweep angle of the section of the leading edge extending from location ΔSA to the wing tip 8. The sweep angle of the trailing edge is less than the sweep angles of the leading edge.

The section of the leading edge inboard of location ΔSA in conventionally referred to as a leading edge glove. In other words, if one were to idealize a wing leading edge as a straight line, then a glove represents a change in slope of the inboard portion of that line. This inboard glove is almost always more highly swept than the base leading edge and has a number of effects. First, it increases average wing sweep. For an aircraft that cruises in the speed ranges of most subsonic transports, the glove tends to reduce wave drag (the portion of drag associated with trans-sonic shock waves). Second, it increases the inboard chord of the wing. This can be used to tailor the span-loading of the wing to a more triangular loading, which can be of benefit to the airplane. The third effect is that it can increase available volume in the wing in the region of the glove. This can be used to hold additional fuel or provide space for integration of systems.

In a conventional manner, the wing has an internal structure comprising a wingbox 36. In FIGS. 2 and 3, the right half of wingbox 36 is indicated by lines comprising alternating dashes and line segments (excluding line ECL, which is also alternating dashes and line segments). The portion of the wingbox inside the right wing panel 16 has a trapezoidal shape. The planform of the left half of the wingbox (not shown in FIGS. 2 and 3) mirrors that of the right half. The unswept portion of the wingbox that passes through the fuselage represents a carry-through structure. Many different wing carry-through structures are known in the art.

Although not shown in FIGS. 2 and 3, a typical wingbox may comprise front and rear spars which extend spanwise along the wing panel, and a multiplicity of ribs that extend chordwise along the wing panel. The ribs are spaced at suitable locations along the span of the wing panel. The forward portion of each rib is joined to the front spar, while the aft portion of each rib is joined to the rear spar. A leading edge panel is conventionally affixed to the front spar and is shaped to form the leading edge section of the wing panel. Similarly, a trailing edge panel is conventionally affixed to the rear spar and is shaped to form the trailing edge section of the wing panel. In conventional manner, the wing panel has upper and lower external skins that are affixed to the front and rear spars and the ribs. The front and rear wing spars are swept, with the front spar being swept in the aft direction to a greater degree than the rear spar.

FIG. 3 shows a plan view of a portion of a wing planform in accordance with one embodiment (again, the wing-mounted exposed propeller engine is not shown). The wing panel shown in FIG. 3 may have the same planform area as that of the wing panel shown in FIG. 2, but differs in that it has more outboard chord and has a leading edge snag 38 that will be buried in the engine mount. If one could overlay FIG. 3 on top of FIG. 2, one would see that the outboard spanwise section 40 of the leading edge in FIG. 3 has been moved forward of its position in FIG. 2 (thereby increasing the length of the outboard chord), whereas the inboard spanwise section 42 of the leading edge in FIG. 3 has been moved rearward of its position in FIG. 2 (thereby decreasing the length of the inboard chord). The increase in outboard chord and decrease in inboard chord are selected to achieve a planform area equivalent to that of the wing configuration shown in FIG. 2 without changing the planform aft of the front spar and without any structural modifications to the trailing edge and control surfaces proximate thereto.

In accordance with one specific implementation, the outboard spanwise portion 40 of the leading edge has a major portion with a first sweep angle and a minor portion with a second sweep angle greater than the first sweep angle. The inboard spanwise portion 42 of the leading edge has a third sweep angle greater than the first sweep angle, but slightly less than the second sweep angle. The location of the transition point where the sweep angle of the outboard spanwise portion 40 transitions from the first to the second sweep angle is indicated by arrow ΔSA to wing tip 8 in FIG. 3. The outboard (40) and inboard (42) spanwise portions of the leading edge are connected by the leading edge snag 38, which is only visible in FIG. 3 because the engine mount is not shown.

Figure 4:
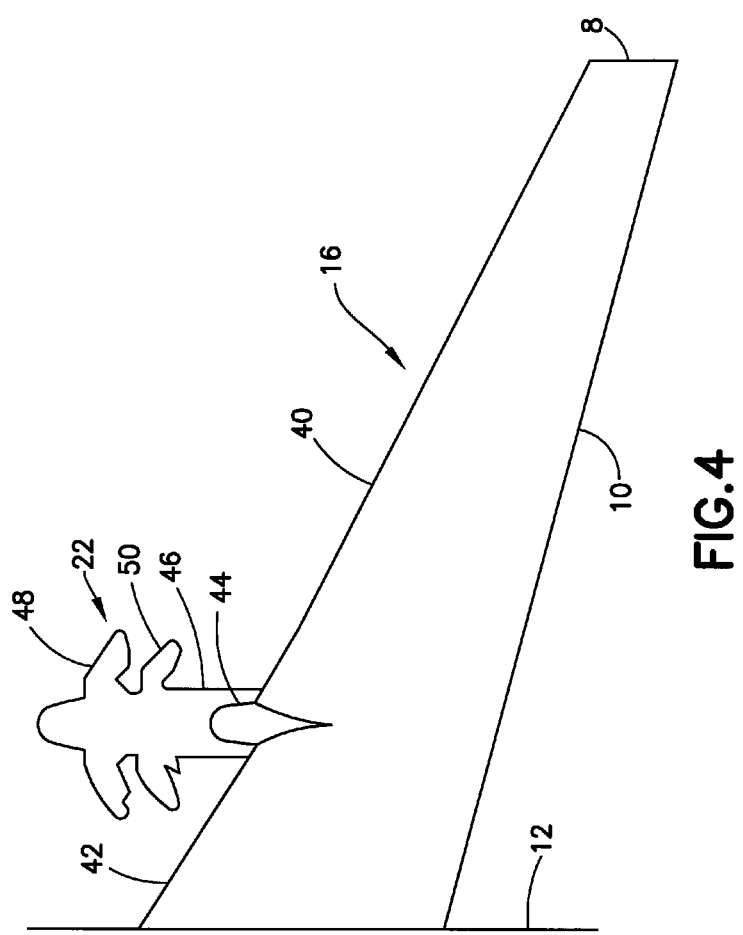
FIG. 4 is a diagram showing a plan view of a portion of a wing planform having a leading edge snag buried in a strut by which an exposed propeller engine is mounted to the wing.
Figure 5:
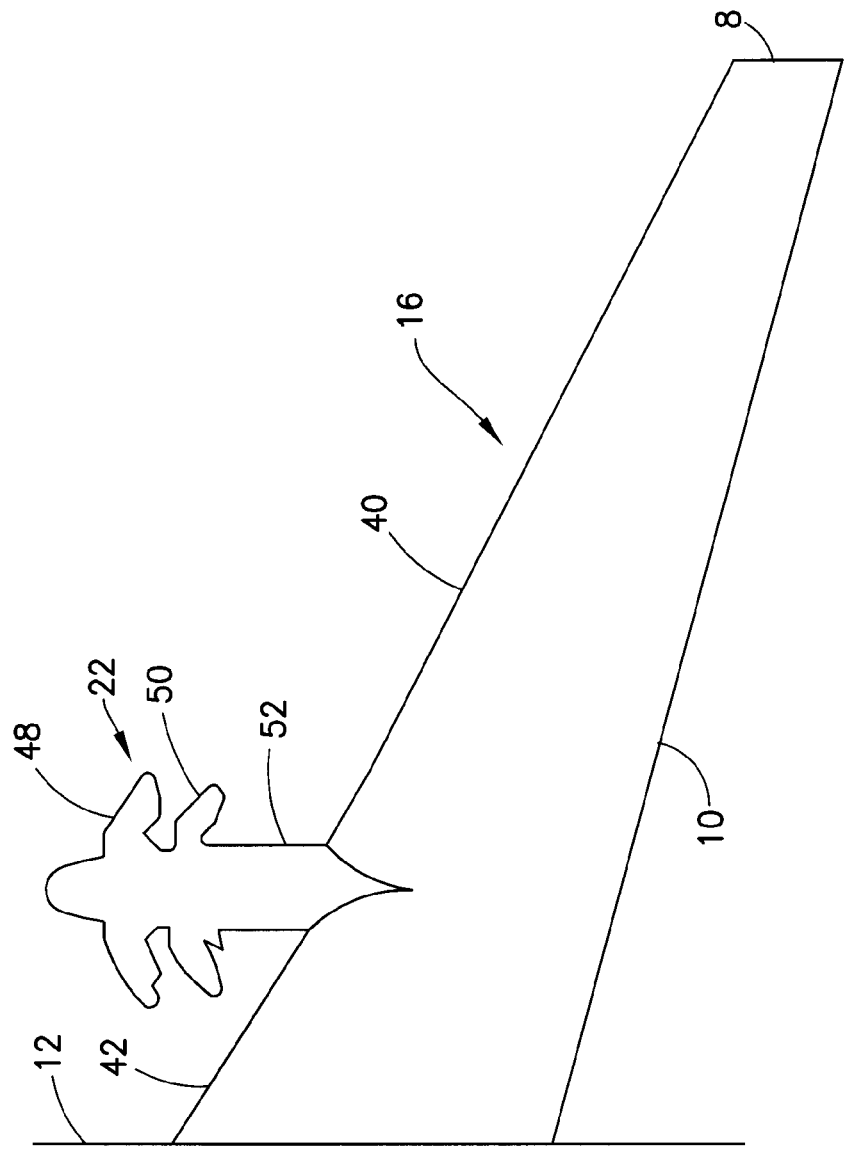
FIG. 5 is a diagram showing a plan view of a portion of a wing planform having a leading edge snag buried inside a slipper nacelle of an exposed propeller engine.

FIGS. 4 and 5 show a profile of an exposed propeller engine 22 having two sets of propeller blades 48 and 50. In the embodiment shown in FIG. 4, the exposed propeller engine 22 comprises an engine nacelle 46 which is mounted to the wing panel 16 by means of a strut 44. In this case the leading edge snag is buried inside the strut 44. In the embodiment shown in FIG. 5, the exposed propeller engine 22 is mounted to the wing panel 16 by means of a slipper nacelle 52. In this case the leading edge snag is buried inside the slipper nacelle 52.

Figure 6:
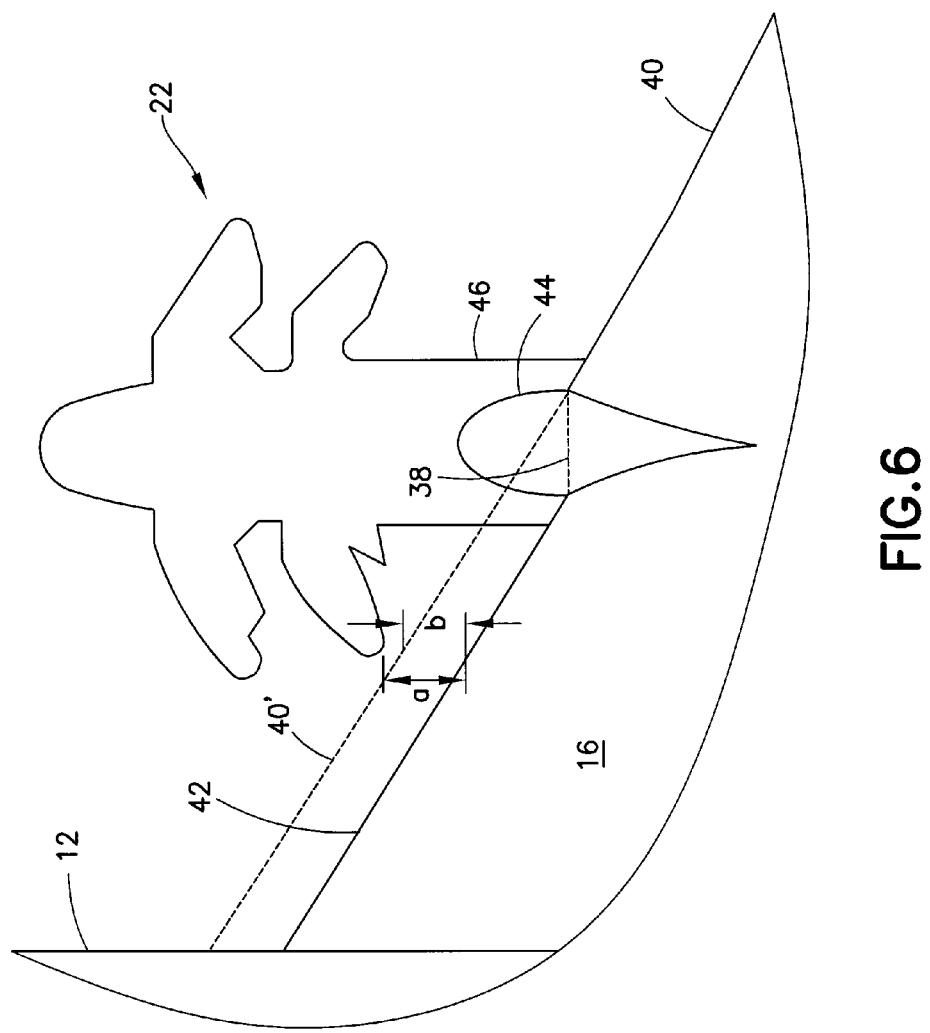
FIG. 6 is a diagram showing a plan view of a portion of a wing planform having an inboard leading edge offset in an aftwise direction relative to an outboard leading edge, a projection of the outboard leading edge being indicated by a dashed line.

FIG. 6 shows a portion of FIG. 4 on a magnified scale. A projection of the outboard spanwise portion 40 of the leading edge is indicated by dashed line 40' in FIG. 6. The leading edge snag buried in the strut 44 is indicated by dashed line 38. Dimension a indicates the distance of closest approach of the inboard spanwise portion 42 of the leading edge to the propeller blades. Dimension b indicates the increase in the distance of closest approach of the inboard spanwise portion 42 to the propeller blades due to snag 38. The ability to mount engines closer to the leading edge of the aerodynamic surface of the wing potentially results in reduced engine mount lengths or the ability to take full advantage of technologies that reduce engine length (e.g., axial compressors).

The change in local chord (i.e., decreased inboard chord) results in a change in front spar depth. Because the snag tends to reduce the inboard chord, it has the opposite impact of a glove with respect to chord and spar thickness. However, it still tends to diminish wave drag associated with the planform because the local leading edge sweep is maintained. The way that the snag is constructed (from a wing planform point of view) impacts the magnitude of the change in front spar depth, i.e., the depth of the spar will depend on both the size of the snag (in terms of chord) and the sweep of the wing in the region of the snag.

Because of the impact on the front spar depth and the relative amount of the wing devoted to leading and trailing edge devices, this solution works best with a wing that has a leading edge glove. This is typical of a high-wing without wing-mounted main landing gear, a type of wing that is already advantageous to an exposed propeller engine for other reasons, notably propeller ground clearance.

If the wing chord increases due to the application of a glove, then the front spar will be located relatively further aft in wing. This means it will be located in a slightly thicker portion of the wing. Because spars primarily exist to counter wing bending and bending strength is proportional to spar depth, the increase in depth will tend to reduce the weight of the spar to a first order of magnitude estimation.

The snag will tend to have the opposite effect, so it will move the spar relatively forward in the wing chord and reduce its depth. The benefit of applying the snag with a leading edge glove is that the adverse spar depth effects will be counteracted and the wing will still benefit from an increase in sweep angle.

While the invention has been described with reference to various embodiments, it will be understood by those skilled in the art that various changes may be made and equivalents may be substituted for elements thereof without departing from the scope of the invention. In addition, many modifications may be made to adapt a particular situation to the teachings herein without departing from the essential scope thereof. Therefore it is intended that the claims not be limited to the particular embodiments disclosed.

The invention claimed is:

1. An aircraft comprising a fuselage, a swept airfoil-shaped body projecting from said fuselage, an exposed propeller engine mounted to said airfoil-shaped body, and a strut that connects said exposed propeller engine to said airfoil-shaped body, wherein said airfoil-shaped body comprises a leading edge comprising a snag coincident with a mounting location of said exposed propeller engine and buried inside said strut, an inboard spanwise portion disposed between said fuselage and said exposed propeller engine, and an outboard spanwise portion disposed between said exposed propeller engine and a tip of said airfoil-shaped body, said inboard spanwise portion being offset in an aftwise direction relative to said outboard spanwise portion.

2. The aircraft as recited in claim 1, wherein said airfoil-shaped body is a wing.

3. The aircraft as recited in claim 1, wherein said airfoil-shaped body is a tail.

4. The aircraft as recited in claim 1, wherein said inboard spanwise portion of said leading edge has a sweep angle greater than a sweep angle of a major portion of said outboard spanwise portion of said leading edge.

5. The aircraft as recited in claim 4, wherein a minor portion of said outboard spanwise portion of said leading edge has a sweep angle greater than said sweep angle of said inboard spanwise portion of said leading edge.

6. An aircraft comprising a fuselage, a wingbox that is attached to said fuselage, left and right wing panels supported by said wingbox, first and second exposed propeller engines respectively mounted to said left and right wing panels, and a respective strut that connects a respective exposed propeller engine to a respective one of said left and right wing panels, wherein each of said left and right wing panels comprises upper and lower surfaces and swept leading and trailing edges, each leading edge comprising an inboard spanwise portion disposed between said fuselage and the exposed propeller engine mounted thereto, an outboard spanwise portion disposed between the exposed propeller engine mounted thereto and a tip of the wing panel, and a snag that connects said inboard and outboard spanwise portions at the location of the exposed propeller engine mounted thereto and is buried inside a respective strut, said inboard spanwise portion being offset in an aftwise direction relative to said outboard spanwise portion.

7. The aircraft as recited in claim 6, wherein the inboard spanwise portion of each leading edge has a sweep angle greater than a sweep angle of a major portion of the outboard spanwise portion of the same leading edge.

8. The aircraft as recited in claim 7, wherein a minor portion of the outboard spanwise portion of each leading edge has a sweep angle greater than said sweep angle of the inboard spanwise portion of the same leading edge.

9. An aircraft comprising a fuselage, a swept airfoil-shaped body projecting from said fuselage, an exposed propeller engine mounted to said airfoil-shaped body, and a slipper nacelle that connects said exposed propeller engine to said airfoil-shaped body, wherein said airfoil-shaped body comprises a leading edge comprising a snag coincident with a mounting location of said exposed propeller engine and buried inside slipper nacelle, an inboard spanwise portion disposed between said fuselage and said exposed propeller engine, and an outboard spanwise portion disposed between said exposed propeller engine and a tip of said airfoil-shaped body, said inboard spanwise portion being offset in an aftwise direction relative to said outboard spanwise portion.

10. An aircraft comprising a fuselage, a wingbox that is attached to said fuselage, left and right wing panels supported by said wingbox, first and second exposed propeller engines respectively mounted to said left and right wing panels, and a respective slipper nacelle that surrounds a respective exposed propeller engine, wherein each of said left and right wing panels comprises upper and lower surfaces and swept leading and trailing edges, each leading edge comprising an inboard spanwise portion disposed between said fuselage and the exposed propeller engine mounted thereto, an outboard spanwise portion disposed between the exposed propeller engine mounted thereto and a tip of the wing panel, and a snag that connects said inboard and outboard spanwise portions at the location of the exposed propeller engine mounted thereto and is buried inside a respective slipper nacelle, said inboard spanwise portion being offset in an aftwise direction relative to said outboard spanwise portion.

* * * * *